US00RE45328E

(19) United States
(12) Reissued Patent
Tuller

(10) Patent Number: US RE45,328 E
(45) Date of Reissued Patent: Jan. 13, 2015

(54) LOCKING SHOE AND MOUNTING BRACKET FOR CURL SPRING WINDOW BALANCE SYSTEM

(75) Inventor: Jeff Tuller, Rochester, NY (US)

(73) Assignee: Caldwell Manufacturing Company North America, LLC, Rochester, NY (US)

(21) Appl. No.: 13/524,003

(22) Filed: Jun. 15, 2012

Related U.S. Patent Documents

Reissue of:
(64) Patent No.: 7,735,191
Issued: Jun. 15, 2010
Appl. No.: 11/668,112
Filed: Jan. 29, 2007

(51) Int. Cl.
*E05D 13/00* (2006.01)

(52) U.S. Cl.
USPC ..... 16/193; 16/197

(58) Field of Classification Search
CPC ..... E05D 15/22; E05D 13/08; E05D 13/1276; E05D 13/1207; E05Y 2900/148
USPC ..... 16/193, 401, DIG. 16, 197; 49/445, 447, 49/176, 181; 160/191, 192, 84.04, 170, 160/171
See application file for complete search history.

(56) References Cited

U.S. PATENT DOCUMENTS

| | | | | |
|---|---|---|---|---|
| 2,732,594 | A * | 1/1956 | Adams et al. | 16/198 |
| 5,353,548 | A | 10/1994 | Westfall | |
| 5,463,793 | A | 11/1995 | Westfall | |
| 5,661,927 | A * | 9/1997 | Polowinczak et al. | 49/447 |
| 6,990,710 | B2 * | 1/2006 | Kunz et al. | 16/193 |
| 2004/0163209 | A1 * | 8/2004 | Pettit | 16/197 |
| 2005/0229492 | A1 | 10/2005 | Robertson | |

* cited by examiner

*Primary Examiner* — Victor Batson
*Assistant Examiner* — Michael Lee
(74) *Attorney, Agent, or Firm* — Harness, Dickey & Pierce, P.L.C.

(57) ABSTRACT

A curl spring sash shoe cassette improves upon the suggestions of U.S. Pat. Nos. 5,353,548 and 5,463,793 by providing a mounting bracket that holds an uncurled length of the curl spring and is securely mounted on top of the shoe cassette to maintain an assembly of the shoe body, the curl spring, and the mount during shipment to a window manufacturer. The mount can receive two mounting screws to resist torque caused by curl springs and sash weight. The shoe is also improved to facilitate removal and reinsertion of sash pins into the tilt lock cams of the shoes and ensure that shoe body halves do not rotate relative to each other when sash tilting splays the body halves apart to lock them in a shoe channel.

37 Claims, 5 Drawing Sheets

LOCKING SHOE AND MOUNTING BRACKET FOR CURL SPRING WINDOW BALANCE SYSTEM

Matter enclosed in heavy brackets [ ] appears in the original patent but forms no part of this reissue specification; matter printed in italics indicates the additions made by reissue.

FIELD OF THE INVENTION

Counterbalance systems for vertically movable window sash.

BACKGROUND

This invention improves on a locking shoe and mounting bracket usable with a curl spring window balance system such as explained in U.S. Pat. Nos. 5,353,548, and 5,463,793. The invention adds convenience and reliability to the proposals of those patents.

SUMMARY

The improvements made by this invention include a mounting bracket that can hold its position while being shipped with a shoe cassette holding a curl spring and yet can automatically disengage from the spring shoe when fastened to a sash jamb channel. The shoe cassettes are also preferably formed of identical halves that are unhanded so that a shoe cassette can be deployed on either side of a window sash. The cassette halves are preferably configured to resist relative rotation as they are splayed apart in response to cam action of a tilt lock cam contained within the shoe. The tilt lock cams can be configured to retain headed sash pins, or can have recesses or slots that allow a sash pin to extend more than half way through a locking cam. The improved system also allows locking pads to be inexpensively installed on the shoes to exert increased locking friction when a sash tilts and shoe cams lock the shoes in their channels.

DRAWINGS

DETAILED DESCRIPTION

Figure 2:
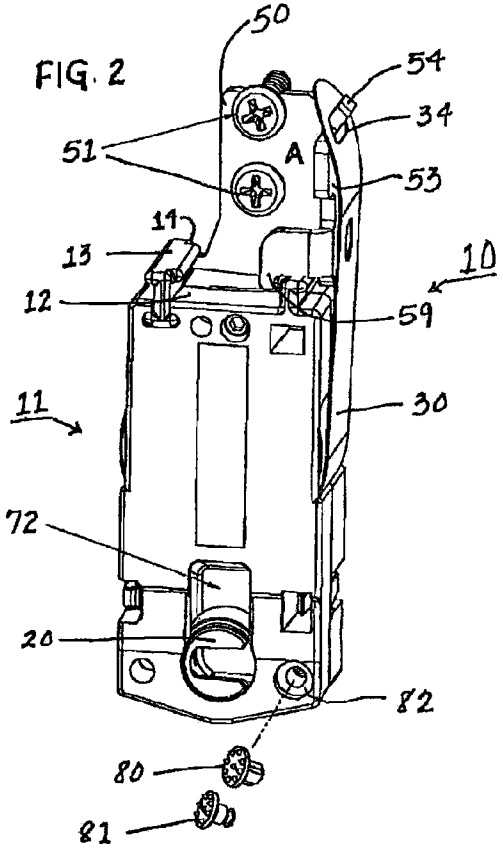
FIG. 2 is an isometric view of a shoe cassette, including a curl spring, a spring mount, and optional locking pads to counter balance an opposite side of a window sash.

Shoe cartridges or cassettes 10, such as illustrated in FIGS. 1, 2, 6 and 7, include shoe bodies 11 that contain curl springs 30 and locking cams 20. Shoe bodies 11 are preferably molded in halves 11a and 11b that are identical and that fit together in an interlock allowing a lower region of the shoe bodies to expand or splay apart in response to rotation of locking cam 20. Shoe body halves 11a and 11b are preferably interconnected at their upper regions by a pair of headed rails or ridges that are formed on each of the body halves to slide into an interconnect with the opposite body half.

An upper edge or top region 12 of shoe body 11 supports mounting bracket 50. A short length of curl spring 30 is uncurled from shoe body 11 and is attached to mounting bracket 50, which can hold the assembled shoe body 11, curl spring 30, and mounting bracket 50 together for assembly into a window or shipment to a window manufacturer.

Mounting bracket 50 improves on a simpler bracket suggested in the '548 and '793 patents. Bracket 50 is robust enough, and well enough braced and interlocked at the top 12 of shoe body 11, to hold itself and curl spring 30 in place in an assembled cassette 10 during shipment. This provides the convenience to a window manufacturer of shoe cassettes arriving assembled with mounting bracket 50 ready to secure each cartridge in a shoe channel of a window jamb. All that is necessary is to slide each cassette into a shoe channel to the mount position, and then drive in one or two fastening screws 51 to fasten mounting bracket 50 in place. Two fasteners or mounting screws 51 are preferred so that mounting bracket 50 can resist a torque or turning force applied by curl spring 30. In some jamb channels, mounting bracket 50 can be blocked from rotation by channel walls, making a single mounting screw 51 all that is necessary for securely holding mounting bracket 50 in place.

Figure 4:
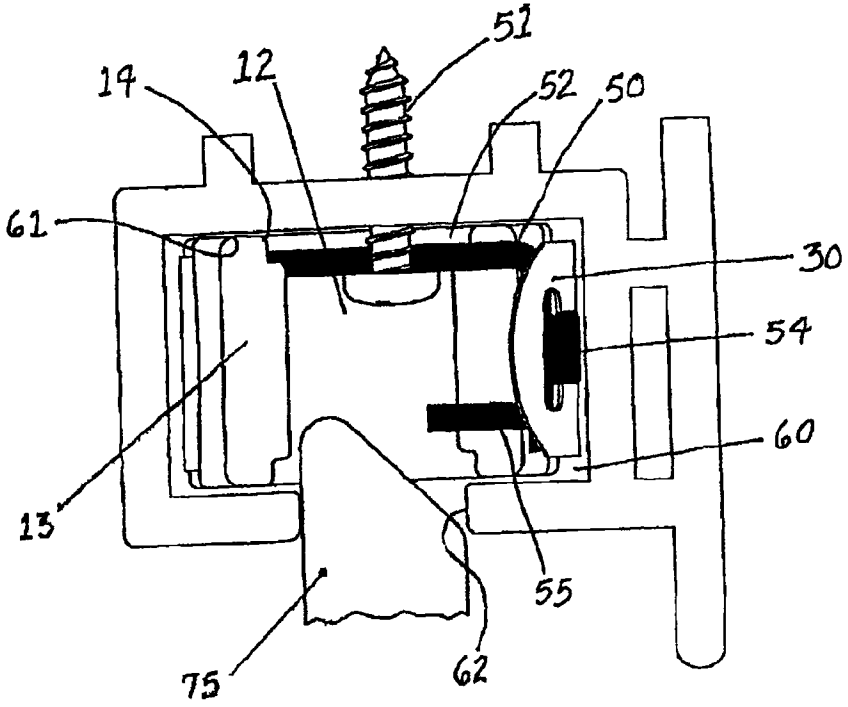
FIG. 4 is a fragmentary cross-sectional top view of the shoe cassette of FIG. 2 partially mounted within a shoe channel of a window jamb to illustrate how the shoe mount (in solid black) clears a tilt latch of a sash.
Figure 3:
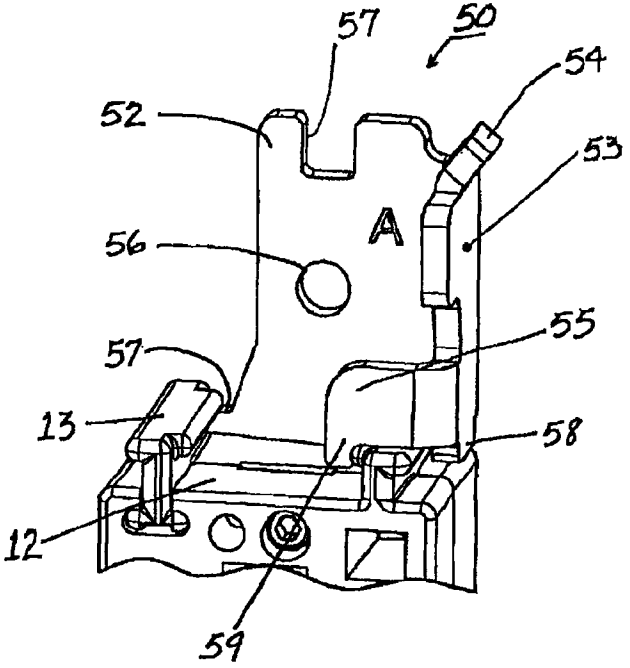
FIG. 3 is a fragmentary view of an upper region of the cassette of FIG. 2 omitting a curl spring to help illustrate a preferred configuration of shoe mount.
Figure 5:
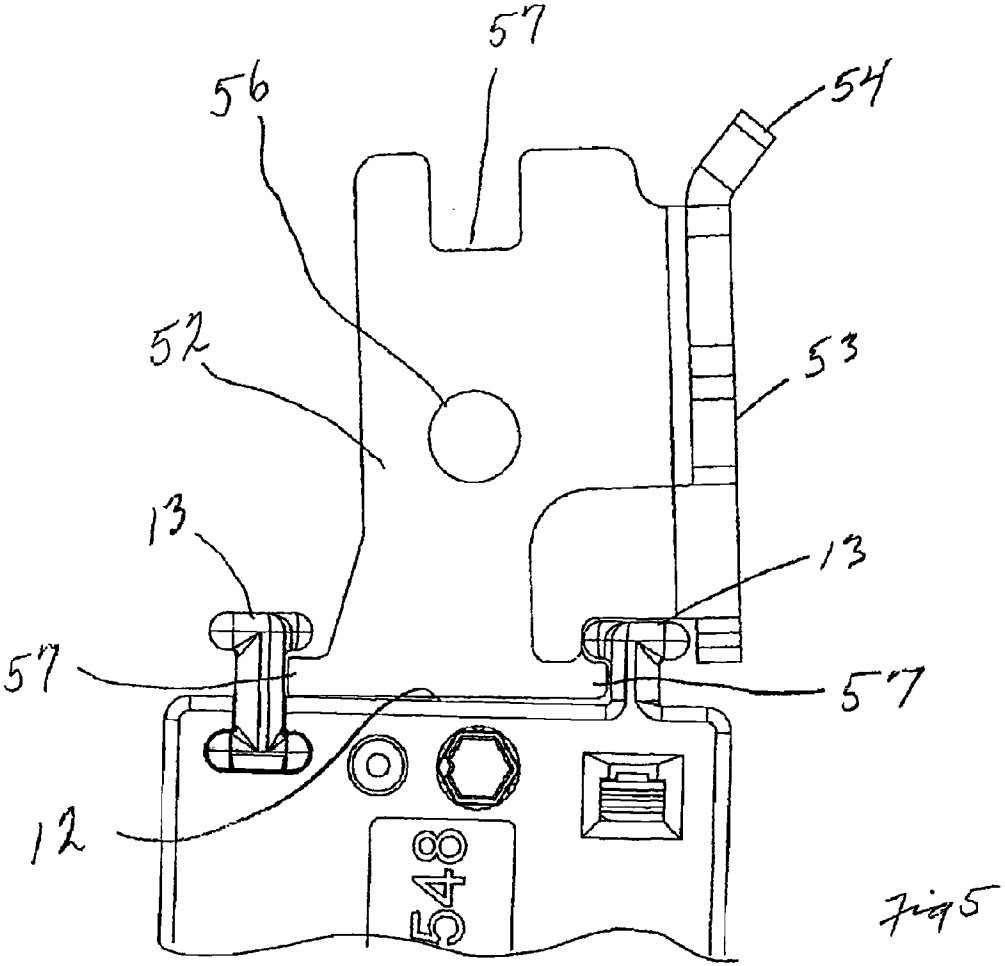
FIG. 5 is a fragmentary rear view of the mounting bracket and the top of the shoe cassette of FIG. 2 to illustrate how the mounting bracket mounts on the shoe body.

To accomplish its improvements, mounting bracket 50 preferably includes mounting wall 52, spring holding wall 53, and brace 55, as best shown in FIGS. 3,4 and 5. Mounting wall 52 is preferably flat so that it can be fastened snuggly against back wall 61 of shoe channel 60. Mounting wall 52 also includes a hole 56 or a hole 56 and a slot 57 to receive one or two mounting screws 51. Spring holding wall 53 includes a projection 54 oriented to fit into an opening 34 in curl spring 30, which exerts a downward pull on mounting bracket 50 to hold spring 30, mount 50, and body 11 in the assembled position illustrated in FIGS. 1 and 2. Spring holding wall 53 is preferably normal or perpendicular to mounting wall 52, and brace 55 preferably extends normal or perpendicular to spring holding wall 53 and parallel with mounting wall 55. The interrelationship between walls 52 and 53 and brace 55 cooperates with the downward bias of spring 30, to securely support mount 50 on the top 12 of shoe body 11.

The top or upper surface 12 of shoe body halves 11a and b preferably include headed ridge or "dog bone" shaped connectors 13 that hold shoe body halves 11a and b together in proper alignment. Connectors 13 also allow a superposed attachment of an additional curl spring container mounted on top of shoe body 11. The headed rail connectors also provide a sturdy interlock with mount 50, as shown in FIG. 5.

Mounting wall 52 preferably has an opposed pair of projections 85 that extend under headed connectors 13 to prevent mounting bracket 50 from pivoting out of its position on the top 12 of body 11. The projection 85 that is farthest from spring holding wall 53 is especially well positioned to prevent this. Spring holding wall 53 has a downwardly extending projection 58 that overlaps with the adjacent dog bone connector 13. Brace 55 rests on top of a connector 13, and has a projection 59 (FIGS. 1-3) that hooks over an edge of the connector 13 on which it rests. All these features ensure that mounting bracket 50 stays reliably in place on top of shoe body 11, especially when curl spring 30 provides a downward force pulling mounting bracket 50 downward against the top of shoe body 11.

Figure 1:
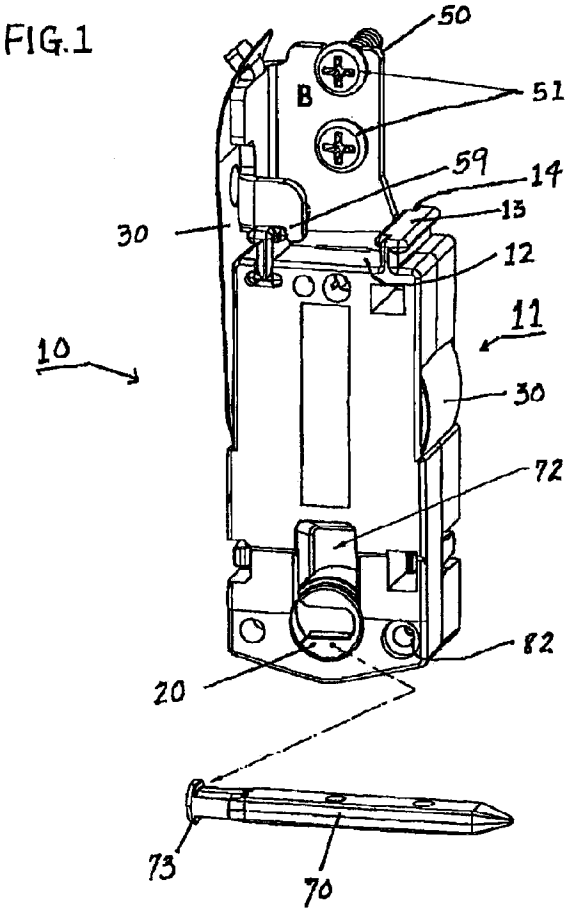
FIG. 1 is an isometric view of a shoe cassette including a curl spring, a spring mount, and a sash pin to counter balance one side of a window sash.

Headed rail connectors 13 have end notches 14 that allow mounting wall projections 85 to escape from under connectors 13 when mounting wall 52 is fully attached flat against back wall 61 of shoe channel 60. In the position of mounting bracket 50 as illustrated in FIG. 4, mounting screw 51 has not been tightened enough to draw mounting bracket 50 snugly against back wall 61 of shoe channel 60 so that mounting bracket 50 has not yet escaped from shoe body 11 via notches 14 in the ends of connector rails 13. Tightening screw 51 beyond the position illustrated in FIG. 4 to draw mounting wall 52 snugly against panel wall 61 then moves projections 85 into notches 14 of connectors 13, which allows mounting bracket 50 to escape or separate from the top 12 of shoe body 11. In practice, this separation occurs when shoe body 11 is pulled downward after mounting bracket 50 is fully secured within channel 60. In effect, the sturdy interlock between mounting bracket 50 and shoe body 11 that allows shipment of assembled cassettes as illustrated in FIGS. 1 and 2 also automatically disconnects mounting bracket 50 from cassette body 11 when mounting bracket 50 is fully secured in place in a shoe channel 60.

Figure 6:
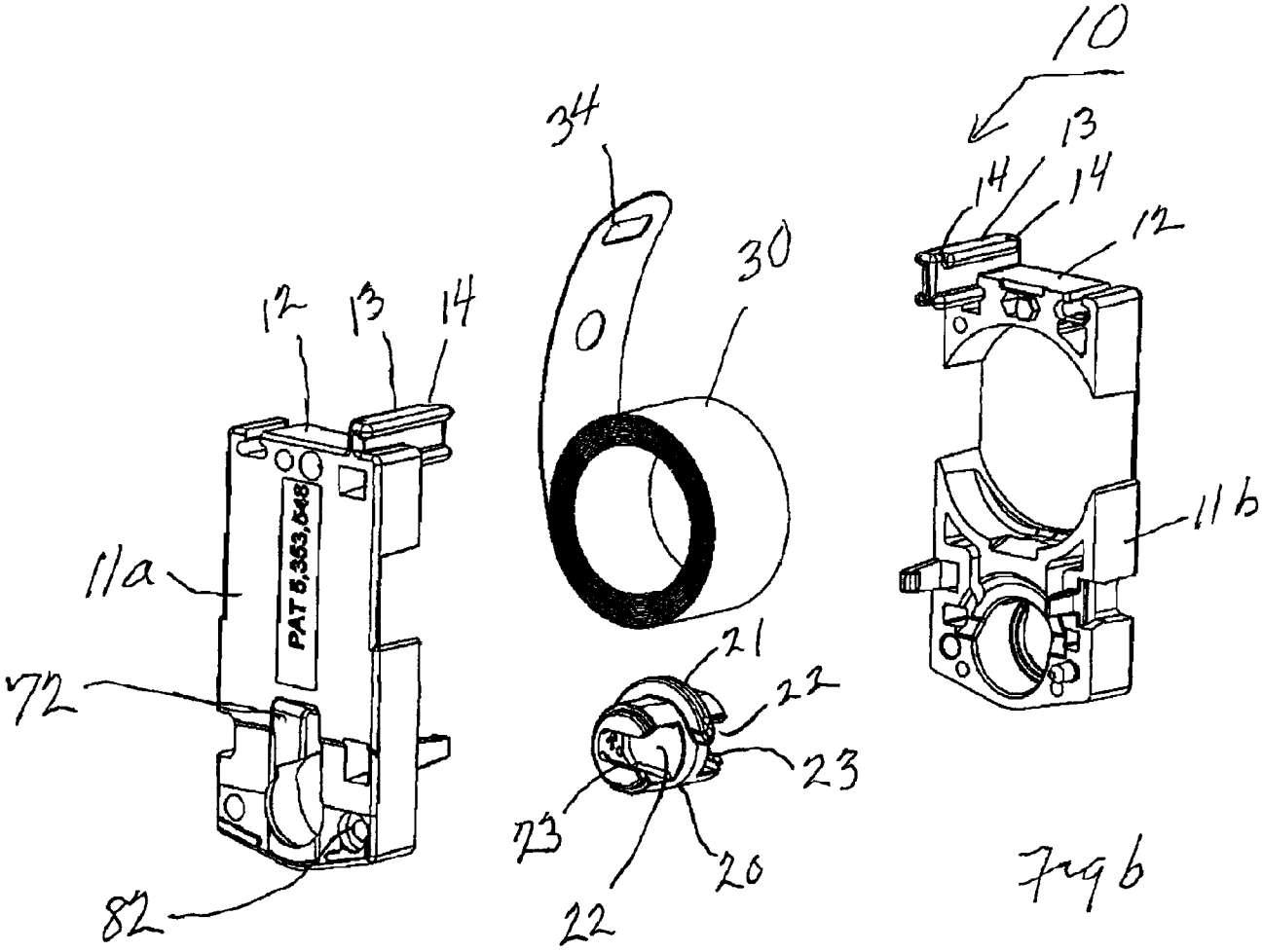
FIG. 6 is an exploded isometric view of the cassette of FIG. 2 showing a curl spring, locking cam, and shoe halves, without a spring mount.
Figure 7:
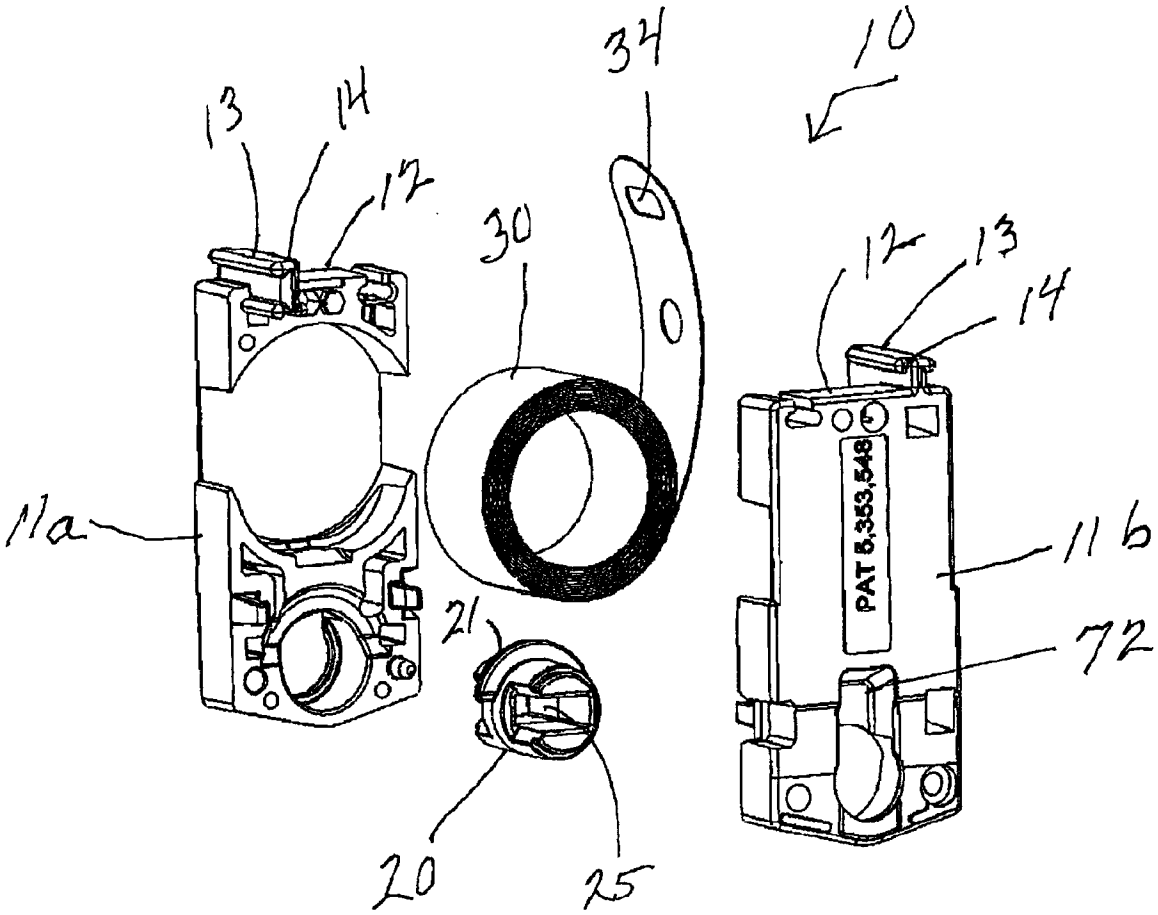
FIG. 7 is an exploded isometric view reversed from the view of FIG. 6 to show that each shoe half includes a rotation resisting projection and recess, and also showing a tilt lock cam with a through channel that can receive a sash pin extending more than half-way through the cam.

Since mounting bracket 50 is preferably free to slide along top surface of shoe body 11 when fastened into a shoe channel, as described, it is desirable to allow relative movement between curl spring 30 and spring holding projection 54. Relative movement at the interconnection between spring 30 and projection 54 allows mounting bracket 50 to slide into mounted position without pulling spring 30 laterally out of its alignment with shoe body 11. A preferred way of accomplishing such relative movement is to make hole 34 in spring 30 an oval or oblong hole or slot, as best shown in FIGS. 6 and 7. Projection 54 can then move laterally within oblong hole or slot 34 to leave spring 30 in its aligned position relative to body 11 while mounting bracket 50 slides laterally into a released position engaging wall 61 of a shoe channel.

As best shown in FIG. 6, locking cam 20 preferably has sash pin channels or slots 22 arranged on opposite sides of an annular cam 21. Each of the cam slots 22 preferably has in turned walls 23 that can capture a head 73 of a sash pin 70 (illustrated in FIG. 1). It is also possible, and is preferred in some situations, for locking cam 20 to have a through recess or channel 25 that allows a sash pin to extend more than half way into locking cam 20 (shown in FIG. 7). A through channel 25 in cam 20 allows a sash pin to penetrate deeply into cam 20 and is preferred to increase the wind resistance of a sash.

Each body part 11a and b preferably has a recess 72 formed above the end regions of cam 20. When a sash supported by cassettes 10 is tilted out of the window plane, cam 20 turns to a locking position that aligns its channel 25 or slots 22 with recesses 72. This allows the heads 73 of sash pin 70 to be raised upward from cam slots 22 or channel 25 and into recesses 72 to facilitate removing a tilted sash from a window.

Recesses 72 also facilitate replacing a removed sash, because recesses 72 allow extra room above cam 20 to receive sash pin 70 that can then be dropped down into cam slots 22 or 25. Recesses 72 also provide a somewhat larger area for maneuvering sash pins 70 into shoe bodies 11a and b before dropping downward into cam channels 25 or slots 22. The sash pins 70 can have heads 73 that interlock with cam edges 23 to prevent withdrawal of sash pin 70 from shoe cassettes 10 if a window is carried in a suitcase fashion before installation. Sash pins 70 can also be un-headed and long enough to extend deeply into cam 20 for improved wind resistance of a sash. The described arrangement of cam channels 22 and 25, recesses 72, and sash pins 70 also allows shoes 11 to be unhanded, so that any shoe can be installed on either side of a sash to be counterbalanced.

Mounting brackets 50, to the contrary, are preferably handed so that each bracket is arranged to be mounted on only one side of a sash. This preference is to assure that mounting brackets 50 do not interfere with tilt latches of a counter balanced sash. FIG. 4 illustrates one way that this can be accomplished. Tilt latch 75, which is typically spring loaded to be snapped into latching engagement with channel slot 62 when a tilted sash is moved back to an upright position, runs in slot 62 of channel 60 where it moves up and down with sash 50 to prevent accidental tilting. When latches 75 are moved inward against their spring bias, they allow deliberate tilting of a counter balanced sash.

Brace 55 of mounting bracket 50 is preferably mounted in an orientation that clears tilt latch 75 so that mounting bracket 50 does not interfere with vertical movement of tilt latch 75 past mounting bracket 50. The left- and right-handedness of mounting bracket 50 as identified by the A and B markings appearing on mounting brackets 50 in FIGS. 1 and 2 ensures that a mounting bracket on each side of a window sash clears the tilt latch 75.

Lower corners of body parts 11a and b preferably have molded recesses 82 that can receive locking pads 80 or 81 to increase a frictional locking effect when a balanced sash tilts to pivot cam 20 to a locking position. Locking pads 80 and 81 (schematically shown in FIG. 2) are alternatives that can be pressed into a recess 82 to achieve a pressed fit in recess 82 for locking pad 80 or a snap fit in recess 82 for locking pad 81. Pads 80 and 81 can be surfaced with different materials and given different surface configurations to increase the frictional security of a shoe lock achieved by pivoting of cam 20 to spread shoe bodies 11a and b somewhat apart within channel 60.

When locking cam 20 pivots with a tilted sash, its cam surface 21 slides in between lower edges of shoe bodies 11a and b to splay the shoe bodies apart and lock the shoe cassette in place in a jamb channel. This splaying apart of the lower regions of shoe bodies 11a and b also produces a force that tends to rotate the shoe bodies relative to each other as they are forced apart by cam surface 21. Such rotation would tend to diminish the splaying apart of the shoe body halves, and this tendency is overcome by projections 15 and corresponding recesses 16 that are formed in the lower region of each shoe half. As bodies 11a and b splay apart in response to rotation of cam surface 21, projections 15 remain engaged with recesses 16 to prevent any relative rotation between shoe halves 11a and 11b. Recesses 16 can be formed as inward facing parts of recesses 82 whose outward facing parts can receive locking pads 80 or 81. Projections 15 and recesses 16 are also preferably alternately formed on each body half 11a and b so that these halves remain identical to each other while providing a pair of mating recesses 16 and projections 15.

What is claimed is:

1. In a window sash counterbalance shoe containing a curl spring disposed with curled convolutions in the shoe and an uncurled length extending to a bracket mounted on a top of the shoe to support the uncurled length of the curl spring during shipment, the bracket having a mounting wall disposed so that a mounting screw can pass through the mounting wall and secure the mounting bracket to a back wall of a shoe channel, the improvement comprising:

the mounting bracket having a spring holding wall normal to the mounting wall and disposed to rest on a top surface of the shoe above which the uncurled length of curl spring extends;

the spring holding wall and the uncurled length of curl spring being configured to interengage so that the uncurled spring length is held by the spring holding wall;

the spring holding wall extending approximately for the width of the curl spring along an edge of the top surface of the shoe so that the spring holding wall and the mounting wall cooperate to resist a pull exerted by the uncurled length of the curl spring; and a brace extends normally from the spring holding wall so that the brace engages the top surface of the shoe in a region spaced from and parallel with the mounting wall.

2. The improvement of claim 1 wherein the mounting wall of the bracket is formed with holes or slots to receive one or two mounting screws to prevent rotation of the mounting bracket from spring force exerted during window operation.

3. The improvement of claim 1 wherein an interlock between the mounting bracket and the top surface of the shoe is configured to release the mounting bracket from the shoe automatically when the mounting bracket is secured to a back wall of the shoe channel.

4. The improvement of claim 3 wherein the spring holding wall has a projection engaged in a laterally extending aperture in the uncurled length of the curl spring to allow the mounting bracket to move laterally of the shoe and the curl spring when the mounting wall is secured to the back wall of the shoe channel.

5. The improvement of claim 1 wherein the mounting bracket is formed in right- and left-hand versions for deployment respectively on right- and left-hand sides of a sash to be counterbalanced so that right- and left-hand tilt latches of the sash respectively clear the right- and left-hand mounting brackets.

6. The improvement of claim 1 wherein the top surface of the shoe has a pair of headed ridges, and the mounting wall has opposed projections that interlock under the headed ridges.

7. The improvement of claim 6 wherein the headed ridges have end notches that automatically release the mounting wall projections when the mounting wall moves laterally of the top surface of the shoe as the mounting wall is secured to the back wall of the shoe channel.

8. A curl spring counterbalance shoe and mounting bracket combination comprising:

the mounting bracket having a mounting wall that in a shipping position engages a top surface of a shoe containing curled convolutions of a curl spring;

the mounting bracket having a spring holder wall perpendicular to the mounting wall and also engaging the top surface of the shoe in the shipping position;

an uncurled length of the curl spring extending up one side of the shoe and along a face of the spring holder wall;

the uncurled length of the curl spring being attached to the spring holder wall so that the mounting wall and the spring retainer wall each resist a portion of the recurl force applied to the mounting bracket by the uncurled length of the curl spring;

the mounting bracket being interlocked with the top surface of the shoe so that the mounting bracket, when attached to the curl spring, is retained on the top surface of the shoe during shipment of the shoe, spring, and mounting bracket; and a brace extends from the spring retainer wall parallel with the mounting wall so that the brace engages the top surface of the shoe spaced from the mounting wall and helps support the spring holder wall against a force exerted by the uncurled length of the curl spring.

9. The combination of claim 8 wherein the mounting bracket is configured to receive two mounting screws to retain the mounting bracket against rotation during sash operation.

10. The combination of claim 8 wherein the mounting bracket is handed so that one configuration of the mounting bracket is arranged on a right side of a sash and an opposite configuration of the mounting bracket is arranged on a left side of the sash, and the mounting brackets, when so arranged, provide clearance for movement of tilt latches on the sash.

11. The combination of claim 8 wherein the mounting bracket and the top surface of the shoe are configured to interlock during shipment and to release the mounting bracket from the shoe automatically when the mounting bracket is mounted in the shoe channel.

12. The combination of claim 11 wherein the top surface of the shoe has parallel headed ridges that interlock with opposed projections of the mounting wall, and notches in heads of the ridges allow the automatic release of the mounting bracket from the shoe when the mounting bracket moves laterally of the shoe during its mounting to the shoe channel.

13. The combination of claim 8 wherein the uncurled length of the curl spring has an aperture engaging a projection on the spring holder wall, and the aperture is laterally wider than the projection to allow the bracket to move laterally of the top surface of the shoe while the projection remains engaged within the aperture.

14. The combination of claim 8 wherein the mounting bracket is formed in right- and left-hand versions for deployment respectively on right- and left-hand sides of a sash to be counterbalanced so that right- and left-hand tilt latches of the sash respectively clear the right- and left-hand mounting brackets.

15. A curl spring shoe and mounting bracket combination comprising:

the mounting bracket in a shipping position having a mounting wall interlocked with a top surface of the shoe;

a spring retainer wall perpendicular to the mounting wall being oriented to align with a side of the shoe from which an uncurled length of curl spring extends upward above the top surface of the shoe;

the spring retainer wall and the uncurled length of the curl spring being configured to interconnect so that the spring retainer wall holds and supports the uncurled length of the curl spring above the top surface of the shoe during shipment;

the interlock of the mounting wall with the top surface of the shoe allowing lateral movement of the mounting bracket along the top surface of the shoe;

the mounting wall interlock with the top surface of the shoe being released when the mounting wall moves laterally into engagement with a back wall of the shoe channel where the mounting wall is secured; and a brace spaced from and parallel with the mounting wall extends perpendicularly from the spring retainer wall to engage the top surface of the shoe to help support the spring retainer wall against a force exerted by the uncurled length of the curl spring.

16. The combination of claim 15 wherein the mounting wall is configured to receive two mounting screws to resist rotational force applied by the curl spring.

17. The combination of claim 15 wherein the spring retainer wall has a projection that fits into an oblong hole in the uncurled length of the curl spring so that the projection can move laterally within the hole when the bracket moves laterally to release the interlock with the top surface of the shoe.

18. The combination of claim 15 wherein the top of the shoe is formed with a pair of headed rails, and the mounting wall is formed with a pair of opposed projections interlocked under heads of the rails.

19. The combination of claim 15 wherein end notches in the rail heads automatically release the interlock with the mounting wall when the bracket is moved laterally for attachment to the back wall of a shoe channel.

20. The combination of claim 15 wherein the bracket is formed in right- and left-hand versions for deployment respectively on right- and left-hand sides of a sash to be counterbalanced so that right- and left-hand tilt latches of the sash respectively clear the right- and left-hand mounting brackets.

*21. A curl spring sash shoe cassette for a window assembly, the sash shoe cassette comprising:*

*a body defining a curl spring bearing surface, a cam aperture, and a recess defined in a first surface of the body and by a ramped surface, said recess being adjacent and coupled to the cam aperture at a first end of the recess, wherein the ramped surface is inclined from the cam aperture toward the first surface;*

*a spring rotatably disposed adjacent the curl spring bearing surface;*

*a cam rotatably disposed within the cam aperture, the cam defining a cam slot having bearing walls, the cam being rotatable from a locked position to unlocked position, wherein the cam slot is aligned with the recess when the cam is in the unlocked position and not aligned with the recess when the cam is in the locked position.*

*22. A curl spring sash shoe cassette of claim 21 wherein the recess has a pair of sides which are generally parallel to a travel direction of the window assembly.*

*23. A curl spring sash shoe cassette of claim 22 wherein the recess has an internal surface generally perpendicular to the pair of sides.*

*24. A curl spring sash shoe cassette of claim 22 wherein the ramped surface is defined between the pair of sides.*

*25. A curl spring sash shoe cassette of claim 21 wherein the spring defines a coupling aperture.*

*26. A curl spring window balance having a shoe cassette configured to be positioned within a jamb channel of a window frame to facilitate the movement of a window sash within the window frame along a longitudinal axis that extends parallel to the jamb channel, the shoe cassette comprising:*

*a body comprising a spring bearing cavity including a spring bearing surface, a cam aperture with an axis generally perpendicular to the longitudinal axis, and a recess in a first side of the body, the recess defined by a pair of opposed first side walls and a ramped bottom surface, the recess adjoining the cam aperture at a first end of the recess, the ramped bottom surface being inclined away from the first end of the recess toward the first side of the body;*

*a curl spring rotatably disposed within the spring bearing cavity, the curl spring having an axis of rotation perpendicular to the longitudinal axis;*

*a cam rotatably disposed within the cam aperture, the cam defining a slot between a pair of second side walls, the cam being rotatable from a locked position to unlocked position, wherein each of the second side walls is aligned with a corresponding one of the first side walls when the cam is in the unlocked position.*

*27. A curl window balance of claim 26 wherein the cam is coupled to a moveable locking member configured to engage the jamb channel.*

*28. A curl spring window balance of claim 26 wherein the spring defines a coupling aperture.*

*29. A curl spring window balance of claim 26 wherein the ramped bottom surface is adjacent a second end of the recess opposite the first end.*

*30. A curl spring window balance of claim 26 wherein the opposed first side walls are generally parallel.*

*31. A curl spring window balance of claim 26 wherein the recess is further defined by a surface generally perpendicular to the opposed first side walls.*

*32. A curl spring window balance having a shoe cassette configured to be positioned within a jamb channel of a window frame to facilitate the movement of a window sash within the window frame along a longitudinal axis that extends parallel to the jamb channel, the shoe cassette comprising:*

*a body comprising a spring bearing cavity including a spring bearing surface, a cam aperture with an axis generally perpendicular to the longitudinal axis, and a recess in a first side of the body, the recess defined by a pair of opposed first side walls and a ramped bottom surface, the recess adjoining the cam aperture at a first end of the recess, the ramped bottom surface being inclined relative to the first end of the recess and extending to the first side of the body;*

*a curl spring rotatably disposed within the spring bearing cavity, the curl spring having an axis of rotation perpendicular to the longitudinal axis;*

*a cam rotatably disposed within the cam aperture, the cam defining a slot between a pair of second side walls, the cam being rotatable from a locked position to unlocked position, wherein each of the second side walls is aligned with a corresponding one of the first side walls when the cam is in the unlocked position.*

*33. A curl spring window balance having a shoe cassette configured to be positioned within a jamb channel of a window frame to facilitate the movement of a window sash within the window frame along a longitudinal axis that extends parallel to the jamb channel, the shoe cassette comprising:*

*a body comprising a spring bearing cavity including a spring bearing surface, a cam aperture with an axis generally perpendicular to the longitudinal axis, and a recess in a first side of the body being defined by a pair of opposed first side walls and a bottom, the recess adjoining the cam aperture at a first end of the recess, the bottom comprising a first bottom surface being inclined away from the first end of the recess and extending toward the first side of the body;*

*a curl spring rotatably disposed within the spring bearing cavity, the curl spring having an axis of rotation perpendicular to the longitudinal axis;*

*a cam rotatably disposed within the cam aperture, the cam defining a slot between a pair of second side walls, the cam being rotatable from a locked position to unlocked position, wherein each of the second side walls is aligned with a corresponding one of the first side walls when the cam is in the unlocked position.*

*34. The curl spring window balance of claim 33 wherein the bottom further comprises a second bottom surface that is generally perpendicular to the opposed first side walls.*

*35. The curl spring window balance of claim 34 wherein the second bottom surface is defined between the cam aperture and the first bottom surface.*

*36. The curl spring window balance of claim 35 wherein the opposed first side walls are generally parallel.*

*37. The curl spring window balance of claim 36 wherein the first bottom surface extends to the first side of the body.*

* * * * *

UNITED STATES PATENT AND TRADEMARK OFFICE

CERTIFICATE OF CORRECTION

PATENT NO. : RE45,328 E
APPLICATION NO. : 13/524003
DATED : January 13, 2015
INVENTOR(S) : Jeff Tuller It is certified that error appears in the above-identified patent and that said Letters Patent is hereby corrected as shown below:

In The Claims

In claim 1, at col. 5, line 11, before "approximately," add - [ -.

In claim 1, at col. 5, line 12, after "spring," add - ] -.

With the foregoing corrections, claim 1, at col. 5, lines 11 - 15, reads as follows:

"the spring holding wall extending [approximately for the width of the curl spring] along an edge of the top surface of the shoe so that the spring holding wall and the mounting wall cooperate to resist a pull exerted by the uncurled length of the curl spring; and"

Signed and Sealed this
Twenty-sixth Day of May, 2015

Michelle K. Lee

Michelle K. Lee
*Director of the United States Patent and Trademark Office*

UNITED STATES PATENT AND TRADEMARK OFFICE

CERTIFICATE OF CORRECTION

PATENT NO. : RE45,328 E
APPLICATION NO. : 13/524003
DATED : January 13, 2015
INVENTOR(S) : Jeff Tuller It is certified that error appears in the above-identified patent and that said Letters Patent is hereby corrected as shown below:

In The Claims

In col. 7, line 39, Claim 21, “unlocked” should be replaced with -- locked --.

In col. 7, line 40, Claim 21, “locked” should be replaced with -- unlocked --.

In col. 8, line 6, Claim 26, “unlocked” should be replaced with -- locked --.

In col. 8, line 44, Claim 32, “unlocked” should be replaced with -- locked --.

In col. 8, line 67, Claim 33, “unlocked” should be replaced with -- locked --.

Signed and Sealed this
Fifteenth Day of December, 2015

Michelle K. Lee

Michelle K. Lee
*Director of the United States Patent and Trademark Office*